(12) United States Patent
Shigekawa et al.

(10) Patent No.: US 9,046,615 B2
(45) Date of Patent: Jun. 2, 2015

(54) PRODUCTION METHOD OF SCINTILLATOR ARRAY

(75) Inventors: Akira Shigekawa, Mishima-gun (JP); Hideo Nitta, Mishima-gun (JP); Satoshi Shiota, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 235 days.

(21) Appl. No.: 13/810,124

(22) PCT Filed: Apr. 24, 2012

(86) PCT No.: PCT/JP2012/060980
§ 371 (c)(1),
(2), (4) Date: Jan. 14, 2013

(87) PCT Pub. No.: WO2012/147747
PCT Pub. Date: Nov. 1, 2012

(65) Prior Publication Data
US 2013/0125385 A1     May 23, 2013

(30) Foreign Application Priority Data

Apr. 25, 2011    (JP) .................................. 2011-096962

(51) Int. Cl.
*H01S 4/00*     (2006.01)
*G01T 1/20*     (2006.01)

(52) U.S. Cl.
CPC ............. *G01T 1/2002* (2013.01); *G01T 1/2008* (2013.01)

(58) Field of Classification Search
CPC .................. G05G 2009/04755; G02B 6/0031; G01T 1/2002; G01T 1/2008; Y10S 438/977
USPC ............. 29/592.1, 595, 884; 250/361 R, 362, 250/367, 370.11, 371
See application file for complete search history.

(56) References Cited

U.S. PATENT DOCUMENTS

| | | | |
|---|---|---|---|
| 4,511,799 A | 4/1985 | Bjorkholm | |
| 6,749,761 B1 * | 6/2004 | Andreaco et al. | ............... 216/24 |
| 6,793,857 B2 | 9/2004 | Otto | |
| 6,838,674 B2 * | 1/2005 | Otto | ......................... 250/370.11 |
| 2002/0054954 A1 | 5/2002 | Otto | |
| 2003/0178570 A1 | 9/2003 | Tsunota et al. | |
| 2009/0173885 A1 | 7/2009 | Zeitler et al. | |
| 2010/0219349 A1 | 9/2010 | Furuichi et al. | |
| 2010/0220833 A1 | 9/2010 | Levene et al. | |

FOREIGN PATENT DOCUMENTS

| | | |
|---|---|---|
| JP | 2001-174564 A | 6/2001 |
| JP | 2002-236182 A | 8/2002 |

(Continued)

*Primary Examiner* — Thiem Phan
(74) *Attorney, Agent, or Firm* — Sughrue Mion, PLLC

(57) ABSTRACT

A method for producing a dual-array-type scintillator array, comprising forming first and second scintillator sticks having cell portions by providing first and second scintillator substrates with pluralities of grooves and cutting them in directions perpendicular to the grooves; arranging and fixing plural sets of the first and second scintillator sticks with the cell portions downward on a support plate via spacers; removing base portions from the first and second scintillator sticks by grinding to form first and second cell arrays comprising the first and second cells each arranged in line; forming an integral resin-cured assembly by filling the grooves and gaps of the first and second cell arrays with a resin for a reflector, curing the resin, and then removing the support plate; and cutting a resin layer between the first and second cell arrays in adjacent sets to divide the resin-cured assembly to sets of the first and second cell arrays.

12 Claims, 16 Drawing Sheets

Step A11

(56) References Cited

FOREIGN PATENT DOCUMENTS

| JP | 2004-003970 A | 1/2004 |
|----|---------------|--------|
| JP | 2004-061492 A | 2/2004 |
| JP | 2008-538966 A | 11/2008 |
| JP | 2009-524015 A | 6/2009 |
| JP | 2010-091336 A | 4/2010 |
| WO | 2006/114715 A2 | 11/2006 |
| WO | 2007/105288 A1 | 9/2007 |

* cited by examiner

Step A2

Step a2

Step A3

Step a3

Step A5

Step A6

Step A7

Step A8

Step A9

Step A10

Step A11

Step A5-2

PRODUCTION METHOD OF SCINTILLATOR ARRAY

CROSS REFERENCE TO RELATED APPLICATIONS

This application is a National Stage of International Application No. PCT/JP2012/060980 filed Apr. 24, 2012, the contents of which are incorporated herein by reference in their entirety.

FIELD OF THE INVENTION

The present invention relates to a method for producing a dual-array-type scintillator array for radiation detectors with high precision and efficiency.

BACKGROUND OF THE INVENTION

One of radiographic inspection apparatuses is a computed tomography (CT) apparatus. The CT apparatus comprises an X-ray tube for radiating X-ray fan beams, and a radiation detector comprising a large number of radiation detection elements. The X-ray tube and the radiation detector are arranged oppositely to each other with an object to be measured at center. X-ray fan beams radiated from the X-ray tube pass through the object to be measured, and are detected by the radiation detector. With every radiation having a changed angle, X-ray absorption data are collected to calculate X-ray absorbance at each position in each cross section of the object by computer analysis, thereby forming an image based on the X-ray absorbance. The radiation detection element is constituted by a large number of scintillator cells. The radiation detector includes a detector comprising scintillators and silicon photodiodes, or a detector comprising scintillators and photomultiplier tubes.

A dual-energy detector comprising two types of scintillators with different X-ray detection sensitivity distributions is disclosed, for example, by U.S. Pat. No. 4,511,799 and WO 2006/114715 (JP 2008-538966 A). U.S. Pat. No. 4,511,799 discloses a dual-energy detector in which light emitted from one scintillator is received by one diode, and light emitted from the other scintillator is received by the other diode, but fails to disclose a specific production method thereof. WO 2006/114715 also fails to specifically disclose the production method of a scintillation array.

JP 2002-236182 A (U.S. Pat. No. 6,793,857) discloses a method for producing a mono-dimensional or multi-dimensional detector array comprising scintillator cells with different widths. This method comprises (a) forming a composite layer comprising a sensor layer made of a material sensitive to radiation and a substrate layer, and (b) cutting the material of the composite layer from the opposite side to the substrate layer to divide the sensor layer to individual insulated elements, thereby forming partition walls in the sensor layer. However, this method suffers increase in the number of steps as the number of cells increases, resulting in lower assembly precision.

JP 2001-174564 A discloses an X-ray detector array comprising two types of scintillators elements arranged in an X-ray transmission direction for detecting X-rays with different energy distributions, a light-detecting element for each scintillator element being arranged in a direction perpendicular to the scintillator element, and pluralities of scintillator elements and pluralities of light-detecting elements being aligned in lines. Pluralities of scintillator elements are integrally molded with a light-reflective material. However, JP 2001-174564 A does not specifically disclose the production method of the X-ray detector array.

JP 2009-524015 A discloses a method for producing a scintillation array, which comprises producing a scintillation ceramic wafer, forming pluralities of slits on an upper surface of the ceramic wafer in two perpendicular directions, and oxidizing part of the ceramic wafer surface to form a reflection layer. Slits for gaps between individual pixels are also filled with the reflection layer. However, this scintillation array is formed by one type of scintillation ceramic. Thus, JP 2009-524015 A neither discloses nor suggests the technology of arranging two types of scintillation cells with high precision.

OBJECT OF THE INVENTION

Accordingly, an object of the present invention is to provide a method for producing a dual-array-type scintillator array comprising two types of scintillators having different X-ray detection sensitivity distributions with high precision and efficiency.

SUMMARY OF THE INVENTION

The first method of the present invention for producing a dual-array-type scintillator array comprises the steps of
(1) forming a first scintillator stick comprising first scintillator cell portions arranged like a comb by providing a first scintillator substrate with pluralities of grooves, and then cutting the first scintillator substrate in a direction perpendicular to the grooves;
(2) forming a second scintillator stick comprising second scintillator cell portions arranged like a comb by providing a second scintillator substrate having a different composition from that of the first scintillator substrate with pluralities of grooves, and then cutting the second scintillator substrate in a direction perpendicular to the grooves;
(3) arranging and fixing plural sets of the first and second scintillator sticks with the first and second scintillator cell portions downward onto a support plate;
(4) removing base portions from the first and second scintillator sticks by grinding to expose the grooves of the first and second scintillator sticks on the surface, thereby obtaining plural sets of first cell arrays and second cell arrays arranged in parallel, each first cell array being obtained from a line of the first scintillator cells, and each second cell array being obtained from a line of the second scintillator cells;
(5) forming an integral resin-cured assembly comprising plural sets of the first and second cell arrays arranged in parallel by filling at least grooves and gaps of the first and second cell arrays with a resin for a reflector, curing the resin, and then removing the support plate; and
(6) cutting a resin layer between adjacent sets of the first and second cell arrays to divide the resin-cured assembly to sets of the first and second cell arrays.

The second method of the present invention for producing a dual-array-type scintillator array comprises the steps of
(1) forming a first scintillator stick comprising first scintillator cell portions arranged like a comb by providing a first scintillator substrate with pluralities of grooves, and then cutting the first scintillator substrate in a direction perpendicular to the grooves;
(2) forming a second scintillator stick comprising second scintillator cell portions arranged like a comb by providing a second scintillator substrate having a different composition from that of the first scintillator substrate with pluralities of grooves, and then cutting the second scintillator substrate in a direction perpendicular to the grooves;

(3) arranging and fixing plural sets of the first and second scintillator sticks with the first and second scintillator cell portions upward onto a support plate;

(4) forming an integral resin-cured assembly comprising the first and second scintillator sticks by filling at least grooves and gaps of the first and second scintillator sticks with a resin for a reflector, curing the resin, and then removing the support plate;

(5) removing base portions from the first and second scintillator sticks by grinding, to form an integral cell array assembly comprising plural sets of first cell arrays and second cell arrays arranged in parallel, each first cell array being obtained from the first scintillator cell portions, and each second cell array being obtained from the second scintillator cell portions; and (6) cutting a resin layer between adjacent sets of the first and second cell arrays to divide the cell array assembly to sets of the first and second cell arrays.

In the first and second methods, it is preferable that both surfaces of the resin-cured assembly are ground to form an integral cell array assembly having a predetermined thickness, from which the first cell arrays and the second cell arrays are exposed, and that one surface of the cell array assembly, from which the first and second cell arrays are exposed, is then coated with the resin for a reflector.

In the first and second methods, after one surface of the cell array assembly, from which the first and second cell arrays are exposed, is coated with the resin for a reflector, a coating layer of the resin for a reflector is preferably ground to a predetermined thickness.

In the first and second methods, it is preferable that each of the first and second scintillator sticks has a pair of positioning grooves on both sides of the grooves, that a first spacer is inserted into each positioning groove of the first and second scintillator sticks, that a second spacer is disposed between the first scintillator stick and the second scintillator stick in each set, and that a third spacer is disposed between the first scintillator stick and the second scintillator stick in adjacent sets.

In the first and second methods, the first and second scintillator sticks are preferably heat-treated.

In the second method, it is preferable that each of the second and third spacers has a flat, large-area portion disposed between adjacent scintillator sticks, and a vertical portion extending from the large-area portion above the upper surfaces of the first and second scintillator sticks, and that the vertical portions of the second spacers and the vertical portions of the third spacers partially have different colors.

In the second method, the vertical portions of the second and third spacers preferably have different heights and/or widths.

It is preferable that one of the first and second scintillators has high detection sensitivity to high-energy X-rays, while the other has high detection sensitivity to low-energy X-rays.

For example, when the first scintillator is made of yttrium-gadolinium-aluminum-gallium garnet (YGAG), and the second scintillator is made of gadolinium oxysulfide (GOS), X-rays detected by the second scintillator have a higher energy distribution than that of those detected by the first scintillator. In this case, for example, YGAG for the first scintillator preferably has a composition represented by $(Y_{1-x}Gd_x)_{3+a}(Ga_uAl_{1-u})_{5-a}O_{12}$ activated by rare earth elements such as Ce, Pr, etc., wherein x is 0.10-0.5, u is 0.2-0.6, and a is −0.05 to +0.15, and GOS for the second scintillator preferably has a composition represented by $Gd_2O_2S$ activated by at least one element selected from Pr, Ce and Tb.

Also, when the first scintillator is made of yttrium-gadolinium-aluminum-gallium garnet (YGAG), and the second scintillator is made of gadolinium-aluminum-gallium garnet (GGAG), X-rays detected by the second scintillator have a high energy distribution than that of X-rays detected by the first scintillator. In this case, for example, YGAG for the first scintillator preferably has a composition represented by $(Y_{1-x}Gd_x)_{3+a}(Ga_uAl_{1-u})_{5-a}O_{12}$ activated by rare earth elements such as Ce, Pr, etc., wherein x is 0.10-0.5, u is 0.2-0.6, and a is −0.05 to +0.15, and GGAG for the second scintillator preferably has a composition represented by $(Gd_{1-x}Lu_x)_{3+a}(Ga_uAl_{1-u})_{5-a}O_{12}$ activated by rare earth elements such as Ce, Pr, etc., wherein x is 0-0.5, u is 0.2-0.6, and a is −0.05 to +0.15.

DESCRIPTION OF THE PREFERRED EMBODIMENTS

The embodiments of the present invention will be explained in detail below referring to the attached drawings without intention of restricting the present invention thereto. Explanations of each embodiment are applicable to other embodiments unless otherwise mentioned.

[1] First Embodiment

Figure 1:
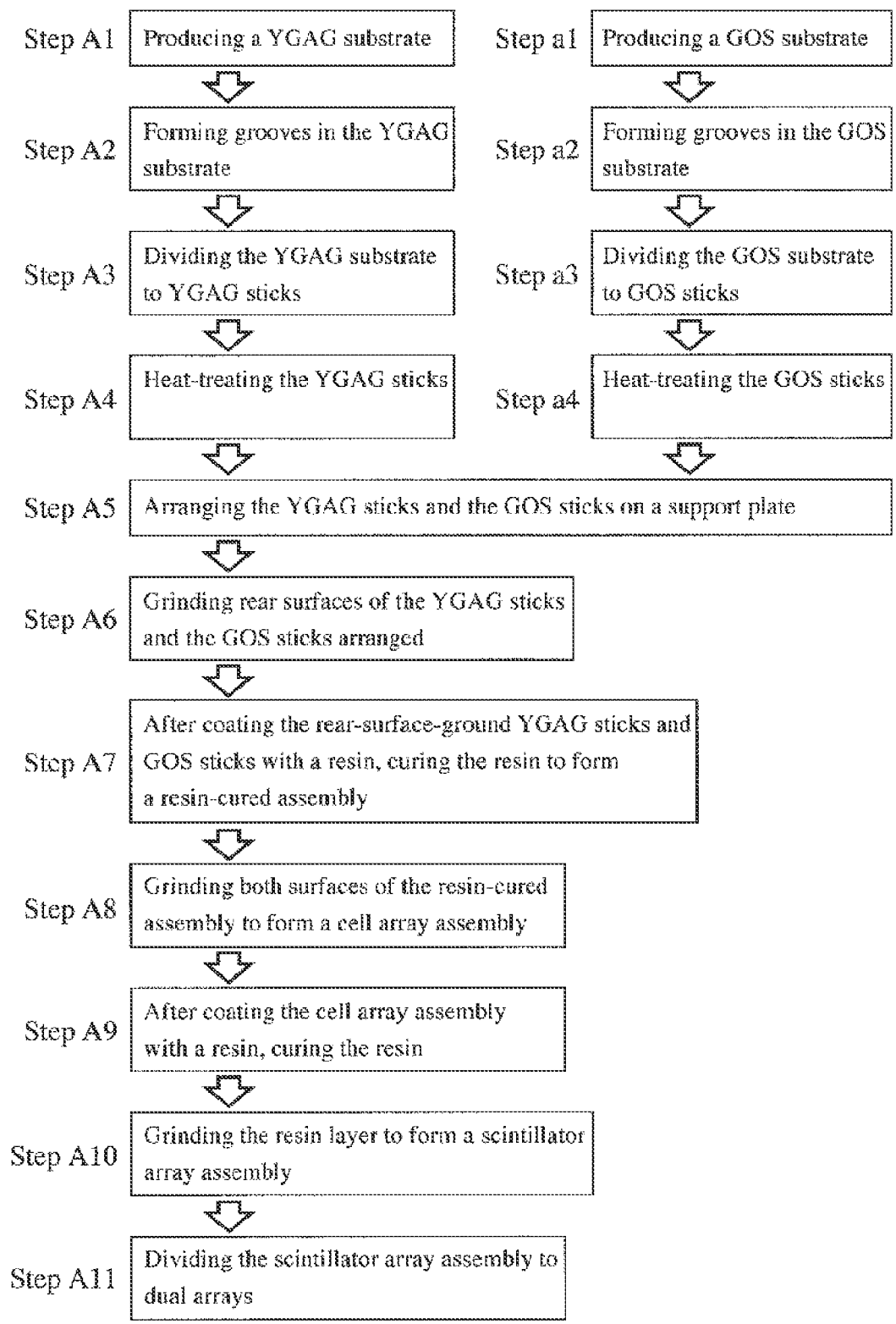
FIG. 1 is a flow chart showing the production method of a scintillator array according to the first embodiment of the present invention.
Figure 2A:
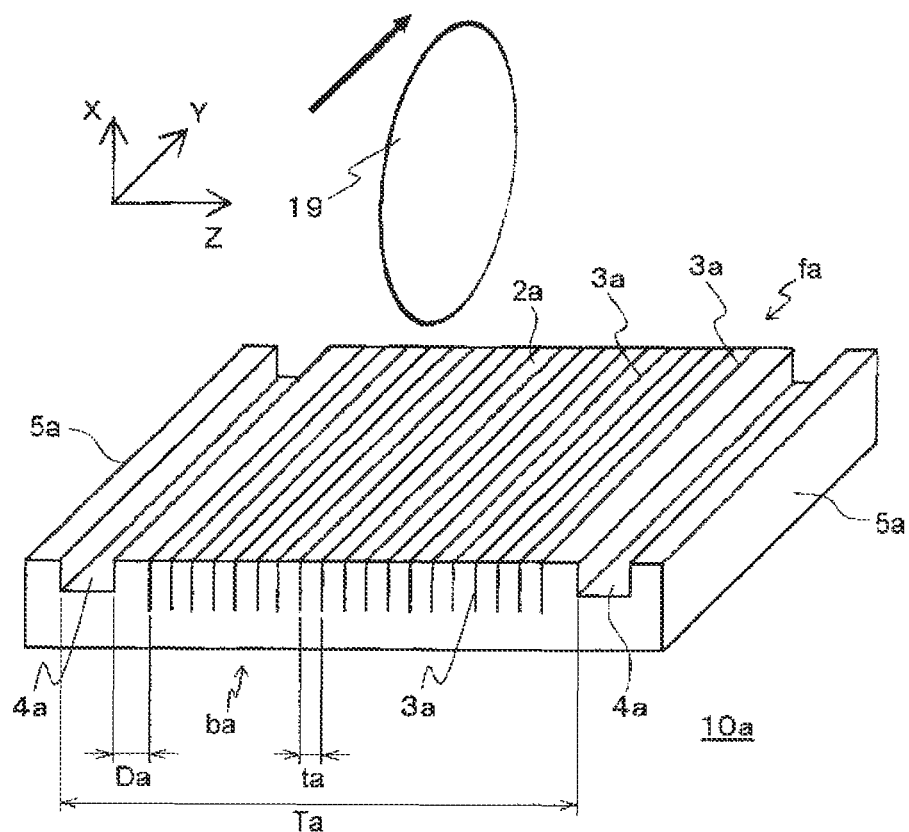
FIG. 2(a) is a perspective view schematically showing a step A2 in the method of the first embodiment.
Figure 11:
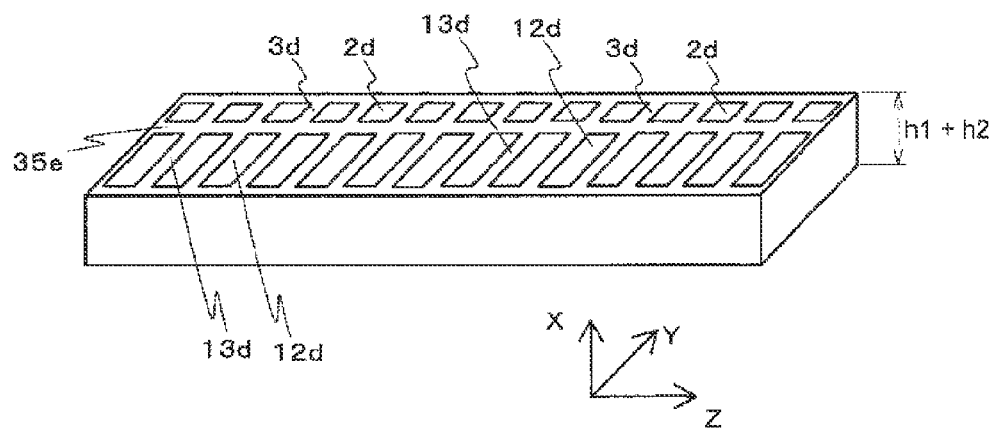
FIG. 11 is a perspective view schematically showing a dual-array-type scintillator array obtained by dividing the scintillator array assembly by a step A11 in the method of the first embodiment.

FIG. 1 is a flow chart showing the production method of a scintillator array according to the first embodiment of the present invention. A rectangular-plate-shaped YGAG substrate 10a formed by a sintered scintillator having a composition of yttrium-gadolinium-aluminum-gallium garnet (YGAG) and activated by an element Ce is first produced (step A1). As shown in FIG. 2(a), pluralities of parallel grooves 3a are then formed on one side of the YGAG substrate 10a by a rotating grinder 19 (step A2). The depth of each groove 3a is preferably about 60-90% of the thickness of the YGAG substrate 10a. Each portion between adjacent grooves 3a constitutes a YGAG cell portion 2a. Though each groove 3a is drawn by a line for simplicity in FIG. 2(a), it actually has a sufficient width relative to each cell portion 2d as shown in FIG. 11. The width of each groove 3a is preferably about 1-10% of the width of each cell portion 2a. Each groove 3a is preferably in parallel to opposing sides 5a of the rectangular-plate-shaped YGAG substrate 10a. In the YGAG substrate 10a, a surface having the grooves 3a is called "front surface fa," and the opposite surface is called "rear surface ba." As shown by coordinate axes in FIG. 2(a), the thickness of the YGAG substrate 10a is in an X direction, pluralities of parallel grooves 3a is in a Y direction, and the grooves 3a (direction perpendicular to the grooves 3a) is arranged in a Z direction.

Formed on both sides of pluralities of grooves 3a (inside the opposing sides 5a of the YGAG substrate 10a) are a pair of positioning grooves 4a in parallel to them. The positioning grooves 4a are preferably in parallel to the opposing sides 5a of the rectangular-plate-shaped YGAG substrate 10a. Because YGAG cells and GOS cells constituting a scintillator array should be aligned without positional disagreement, the distance Da between each positioning groove 4a and the outermost groove 3a in the YGAG substrate 10a should be precisely set.

Figure 3:
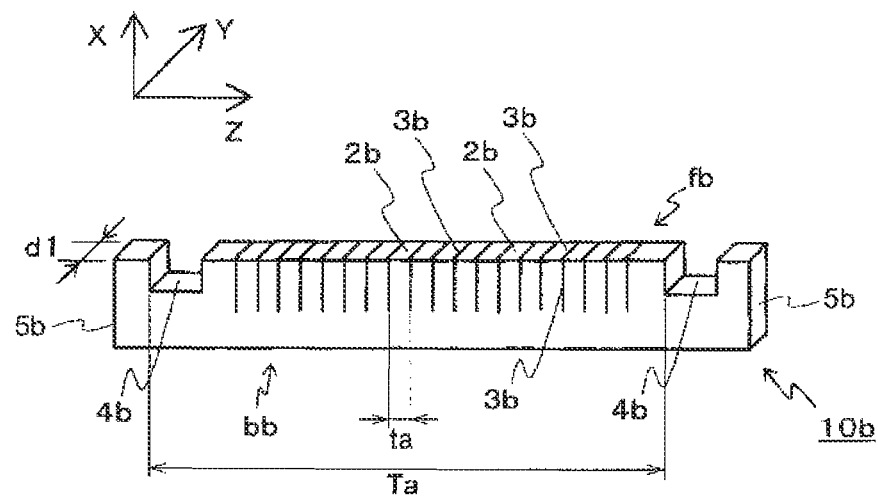
FIG. 3 is a perspective view schematically showing a YGAG stick obtained by a step A3 in the method of the first embodiment.

The rectangular-plate-shaped YGAG substrate 10a provided with pluralities of parallel grooves 3a and a pair of parallel positioning grooves 4a is cut perpendicularly to the grooves 3a with a predetermined width d1, to obtain an elongated YGAG stick 10b having pluralities of grooves as shown in FIG. 3 (step A3). Pluralities of grooves 3a and a pair of positioning grooves 4a are cut shorter to grooves 3b and positioning grooves 4b. Each YGAG cell portion 2a between adjacent grooves 3b is turned to each YGAG cell portion 2b. The front surface fb and rear surface bb of the YGAG stick 10b correspond to the front surface fa and the rear surface ba, respectively. On the side of the front surface fb, pluralities of YGAG cell portions 2b are arranged like a comb and integrally connected by a base portion on the side of the rear surface bb.

To alleviate cutting strain, the YGAG stick 10b is preferably heat-treated if necessary (step A4). When the cutting is made slower, the YGAG stick 10b has lower strain, so that a heat treatment step may be omitted, but the formation of grooves takes longer time by slow cutting. When the heat treatment is carried out, its condition is preferably 1000-1600° C. for 5-200 minutes.

Figure 2B:
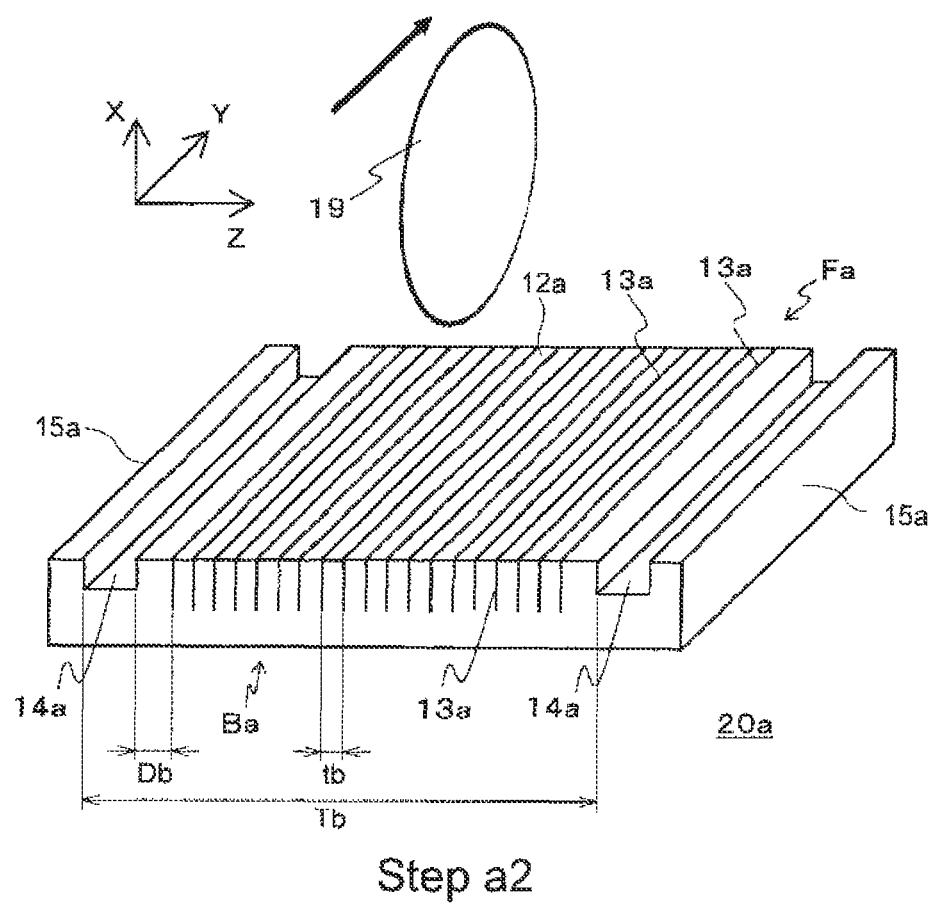
FIG. 2(b) is a perspective view schematically showing a step a2 in the method of the first embodiment.

Also, a rectangular-plate-shaped GOS substrate 20a of a sintered scintillator having a composition of gadolinium oxysulfide activated by Pr and Ce is produced (step a1). The GOS substrate 20a has the same thickness as that of the YGAG substrate 10a. Next, like the step A2, pluralities of parallel grooves 13a are formed on one side of the GOS substrate 20a by a rotating grinder 19 as shown in FIG. 2(b) (step a2). The depth of the grooves 13a is preferably about 60-90% of the thickness of the GOS substrate 20a. Each portion between adjacent grooves 13a constitutes a GOS cell portion 12a. Though each groove 13a is drawn by a line for simplicity in FIG. 2(b), it actually has a sufficient width relative to each cell portion 12d as shown in FIG. 11. The width of each groove 13a is preferably about 1-10% of the width of the each cell portion 12a. The grooves 13a are preferably in parallel to opposing sides 15a of the rectangular-plate-shaped GOS substrate 20a. In the GOS substrate 20a, a surface having the grooves 13a is called "front surface Fa," and the opposite surface is called "rear surface Ba." As shown by coordinate axes in FIG. 2(b), the thickness of the GOS substrate 20a is in an X direction, pluralities of parallel grooves 13a is in a Y direction, and the grooves 13a (direction perpendicular to the grooves 13a) is arranged in a Z direction.

Formed on both sides of pluralities of grooves 13a (inside the opposing sides 15a of the GOS substrate 20a) are a pair of parallel positioning grooves 14a. Like the grooves 13a, the positioning grooves 14a are preferably in parallel to the opposing sides 15a of the rectangular-plate-shaped GOS substrate 20a. Because YGAG cells and GOS cells constituting a scintillator array should be aligned without positional displacement, not only the distance tb between adjacent grooves 13a and the distance Tb between a pair of positioning grooves 14a in the GOS substrate 20a should be precisely equal to the distance to between adjacent grooves 3a and the distance Ta between a pair of positioning grooves 4a in the YGAG substrate 10a, but also the distance Db between each positioning groove 14a and the outermost groove 13a in the GOS substrate 20a should be precisely equal to the distance Da between each positioning groove 4a and the outermost groove 3a in the YGAG substrate 10a.

Figure 4:
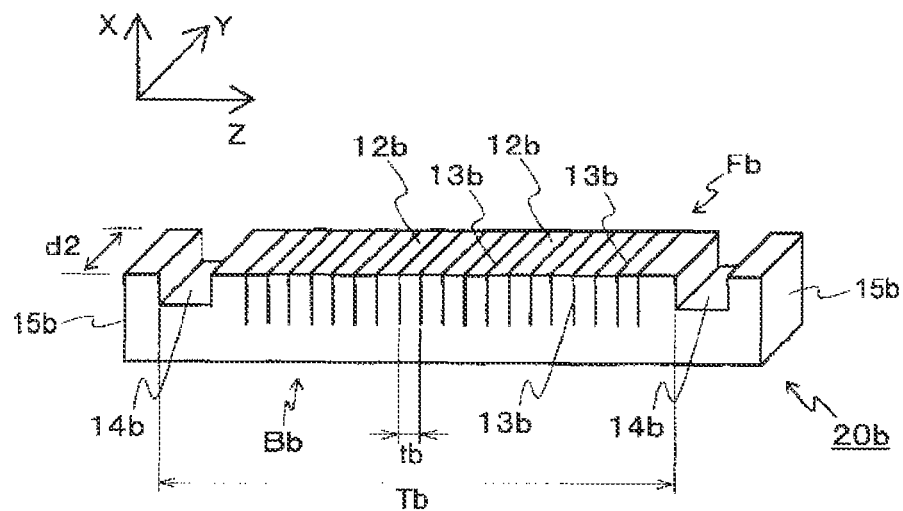
FIG. 4 is a perspective view schematically showing a GOS stick obtained by a step a3 in the method of the first embodiment.

The rectangular-plate-shaped GOS substrate 20a provided with pluralities of parallel grooves 13a and a pair of parallel positioning grooves 14a is cut to a predetermined width d2 perpendicularly to the grooves 13a, obtaining elongated GOS sticks 20b each having pluralities of grooves as shown in FIG. 4 (step a3). The width d2 of the GOS stick 20b is larger than the width d1 of the YGAG stick 10b. The ratio of d2/d1 is preferably 1.1-10. Pluralities of grooves 13a and a pair of positioning grooves 14a are cut to shorter grooves 13b and positioning grooves 14b. GOS cell portions 12a between adjacent grooves 13b are turned to GOS cell portions 12b. The front surface Fb and rear surface Bb of each GOS stick 20b correspond to the front surface Fa and the rear surface Ba, respectively. Pluralities of GOS cell portions 12b are aligned like a comb on the side of the front surface Fb, and integrally connected by a base portion on the side of the rear surface Bb.

To alleviate strain generated by cutting, the GOS stick 20b is preferably heat-treated (step a4). Because as slow cutting as possible reduces strain stored in the GOS stick 20b, a heat treatment step may be omitted, but a low cutting speed takes longer time to form grooves. When the heat treatment is conducted, its condition is preferably 600-1300° C. for 5-200 minutes.

Because the YGAG stick 10b and the GOS stick 20b are obtained by simply cutting the YGAG substrate 10a and the GOS substrate 20a with widths d1 and d2, the distance tb between adjacent grooves 13b and the distance Tb between a pair of positioning grooves 14b in the GOS stick 20b are respectively precisely the same as the distance to between adjacent grooves 3b and the distance Ta between a pair of positioning grooves 4b in the YGAG stick 10b.

Figure 5A:
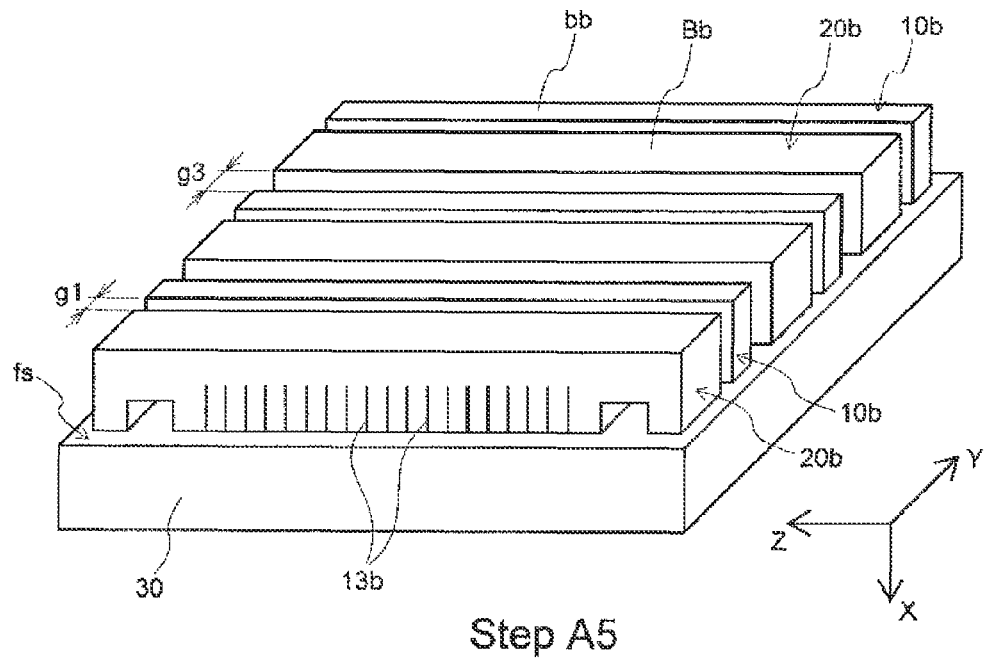
FIG. 5(a) is a perspective view schematically showing YGAG sticks and GOS sticks disposed on a first support plate via an adhesive member and first to third spacers by a step A5 in the method of the first embodiment.

As shown in FIG. 5(a), the YGAG sticks 10b and the GOS sticks 20b are alternately disposed on a surface fs of the first support plate 30 with an adhesive member (not shown), and positioned (step A5). To this end, an adhesive member is attached to the surface fs of the first support plate 30, and two first spacers (not shown) are then disposed in parallel with the same distance as between the positioning grooves 4b and 14b of the YGAG sticks 10b and the GOS sticks 20b. The first spacers may be, for example, rod-shaped pins having square or circular cross sections, which are received in the positioning grooves 4b and 14b. When the first spacers are removed after the YGAG sticks 10b and the GOS sticks 20b are fixed, the first spacers should have cross sections receivable in the positioning grooves 4b and 14b with margin, so that they can be easily removed without sticking to the adhesive member even after the YGAG sticks 10b and the GOS sticks 20b are pressed onto the adhesive member by a press plate. Also, because the first spacers have slightly smaller cross sections than those of the positioning grooves 4b and 14b, one surface of each first spacer is caused to abut one surface of each positioning groove 4b, 14b for positioning in a Z direction.

Because a scintillator array is obtained from a line of YGAG cells and a line of GOS cells aligned in parallel, one YGAG stick 10b and one GOS stick 20b should constitute each set with precise distance therebetween. Accordingly, a second spacer (not shown) is disposed between the YGAG stick 10b and the GOS stick 20b in each set to fix their distance precisely to g1. The second spacer may be a rod-shaped pin having a square cross section whose one side is as long as g1 or a circular cross section having a diameter g1. When the second spacers are removed after positioning the YGAG sticks 10b and the GOS sticks 20b, the second spacers preferably have small contact areas with an adhesive member. In the case of large contact areas, the second spacers are preferably disposed near the positioning grooves 4b, 14b (near portions cut off later).

Because a YGAG stick 10b and a GOS stick 20b in adjacent sets are cut off later, their distance g3 may be about 2 times the width of a scintillator array, not necessarily equal to the distance g1. Accordingly, a third spacer (not shown) is disposed between a YGAG stick 10b and a GOS stick 20b in adjacent sets. The third spacer has a side or diameter whose length is the same as or different from that of the second spacer. The third spacer may be a rod-shaped pin having a square cross section whose side has a length g3 or a circular cross section having a diameter g3. When the third spacers are removed after positioning the YGAG sticks 10b and the GOS sticks 20b, the third spacers preferably have small contact areas with an adhesive member. In the case of large contact areas, the third spacers are preferably disposed near the positioning grooves 4b, 14b (near portions cut off later).

After temporarily positioning all YGAG sticks 10b and GOS sticks 20b via the first to third spacers, the first spacers are precisely positioned, and then fixed to an external frame (not shown). Because the YGAG sticks 10b and the GOS sticks 20b are movable in a Y direction in this state, the YGAG sticks 10b and the GOS sticks 20b arranged via the second and third spacers are lightly pushed in a Y direction, to set their Y-direction distances at g1 and g3 alternately. Thereafter, all YGAG sticks 10b and GOS sticks 20b are lightly pushed in a Z direction, so that one surface of each positioning groove 4b, 14b abuts the first spacer. This procedure is repeated plural times to achieve the precise positioning of the YGAG sticks 10b and the GOS sticks 20b in Y and Z directions.

The adhesive member is not particularly restricted, as long as it can fix the YGAG sticks 10b and the GOS sticks 20b and precisely keep their positions in subsequent steps. It may be, for example, an adhesive, a double-sided adhesive film, a double-sided adhesive tape, etc. Among them, a pressure-sensitive adhesive or a pressure-sensitive, double-sided adhesive film is preferable for precise positioning and handling.

When a pressure-sensitive adhesive or a pressure-sensitive, double-sided adhesive film is put on the surface fs of the first support plate 30, a press plate (not shown) is placed on the upper surfaces of all YGAG sticks 10b and GOS sticks 20b precisely positioned via the first to third spacers. When the press plate is uniformly pushed in an X direction (vertical to the sticks 10b, 20b), the pressure-sensitive adhesive or the pressure-sensitive, double-sided adhesive film exhibits adhesion, so that the front surfaces fb of the YGAG sticks 10b and the front surfaces Fb of the GOS sticks 20b are fixed to the surface fs of the first support plate 30. When the press plate is removed, the rear surfaces bb of the YGAG stick 10b and the rear surfaces Bb of the GOS stick 20b are exposed.

Because the distance to between the grooves 3b and the distance Da between each positioning groove 4b and the outermost groove 3b in each YGAG stick 10b are respectively precisely equal to the distance tb between the grooves 13b and the distance Db between each positioning groove 14b and the outermost groove 13b in each GOS stick 20b, Z-direction positioning by the first spacers prevents positional displacement between pluralities of YGAG cell portions 2b and pluralities of GOS cell portions 12b in a Z direction. Also, the second and third spacers provide the precise positioning of pluralities of YGAG cell portions 2b and GOS cell portions 12b in a Y direction. Because the YGAG sticks 10b and the GOS sticks 20b have the same height, uniform pressing provides the precise positioning of these sticks 10b and 20b in an X direction.

The first to third spacers may be jigs or positioning frames or pins, in place of rod-shaped pins. The positioning pins may be, for example, stainless steel pins of 0.2-1 mm in diameter, etc. When the positioning frames or pins are used, the YGAG sticks 10b and the GOS sticks 20b need not be provided with positioning grooves because rod-shaped pins are not used.

Usable as the positioning frames are thin plates having slots or slits into which the YGAG sticks 10b and the GOS sticks 20b are fit. A material for the positioning frames is, for example, stainless steel or silicon. The use of positioning frames enables the production of scintillator arrays with high precision, efficiency and yield. The use of an integral frame makes the number of steps smaller than when the positioning grooves and the rod-shaped pins are combined, resulting in higher efficiency.

Figure 5B:
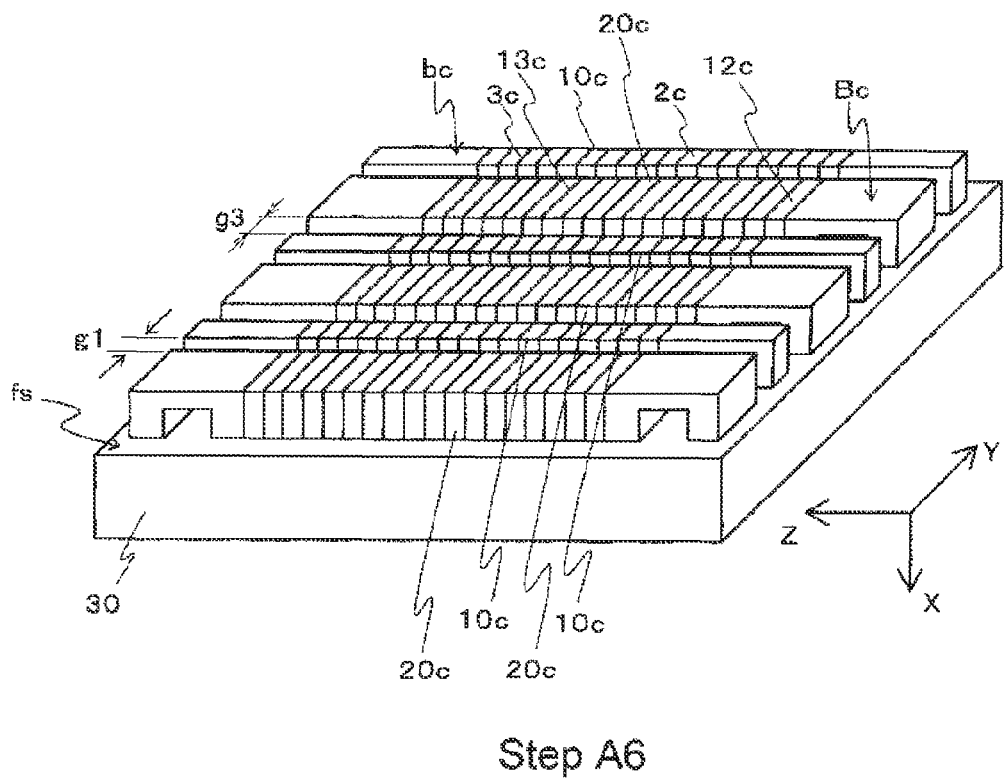
FIG. 5(b) is a perspective view schematically showing YGAG sticks and GOS sticks, whose rear surfaces are ground to remove their base portions by a step A6 in the method of the first embodiment.

After the step A5, the rear surfaces bb of the YGAG sticks 10b and the rear surfaces Bb of the GOS sticks 20b are simultaneously ground flat. When the ground surfaces reach the grooves 13b and 3b, cell portions 2b, 12b connected by the base portions of the YGAG sticks 10b and the GOS sticks 20b are separated as shown in FIG. 5(b), resulting in YGAG cells 2c and GOS cells 12c (step A6). The grooves 3b and 13b of the YGAG sticks 10b and the GOS sticks 20b are turned to grooves 3c, 13c, respectively (step A6). The first to third spacers may be removed after flat grinding. When the first to third spacers are rod-shaped pins, they have such small contact areas with the adhesive member that they can be easily removed after detaching the press plate. When the first to third spacers are disposed near later-cut-off portions of the YGAG sticks 10b and the GOS sticks 20b (portions between the outermost grooves 3b, 13b and the end surfaces 5b, 15b), the first to third spacers need not be removed because these portions are cut off before grinding.

As shown in FIG. 5(b), the cells 2c of the YGAG sticks 10b constitute YGAG cell arrays 10c, and the cells 12c of the GOS sticks 20b constitute GOS cell arrays 20c. The rear surfaces bb of the YGAG cell arrays 10c are turned to rear surfaces bc, and the rear surfaces Bb of the GOS sticks 20b are turned to rear surfaces Bc.

Figure 6:
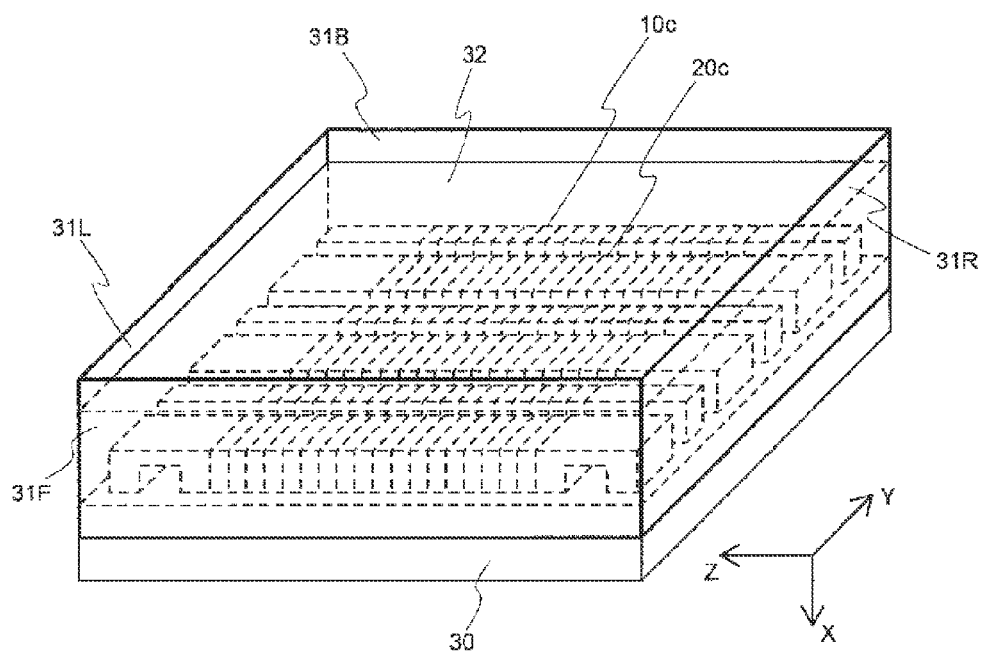
FIG. 6 is a perspective view schematically showing a step A7 in the method of the first embodiment.

As shown in FIG. 6, wide films 31F, 31R, 31B, 31L for storing a resin are attached to four side surfaces of the first support plate 30. Because each film 31F, 31R, 31B, 31L has a sufficiently larger width than the height of the side surfaces of the first support plate 30, four films 31F, 31R, 31B, 31L projecting upward from the first support plate 30 define a space for storing a resin 32, which acts as a reflector when the YGAG cells 2c and the GOS cells 12c emit light. Usable as the resin 32 is, for example, a resin containing white, fine titanium oxide particles. The resin 32 is preferably a thermosetting resin. The resin 32 is charged into the above space, and cured (step A7). Because the resin 32 fills not only the grooves 3c, 13c but also gaps between adjacent YGAG cells 2c and GOS cells 12c, the curing of the resin 32 makes pluralities of YGAG cells 2c and GOS cells 12c integral.

In place of the films 31F, 31R, 31B, 31L, a frame or a box-shaped vessel may be used. The films and the frame are preferably made of plastics easily peelable from the resin, and they may be fluororesins, metal sheets coated with fluororesins, etc. When the resin is directly applied to the YGAG cells 2c and the GOS cells 12c without using films, a frame, etc., a resin having flow-preventing viscosity should be used. Too high viscosity makes the resin less penetrable into the grooves 3c, 13c. Accordingly, a resin with optimum viscosity should be selected.

Figure 7:
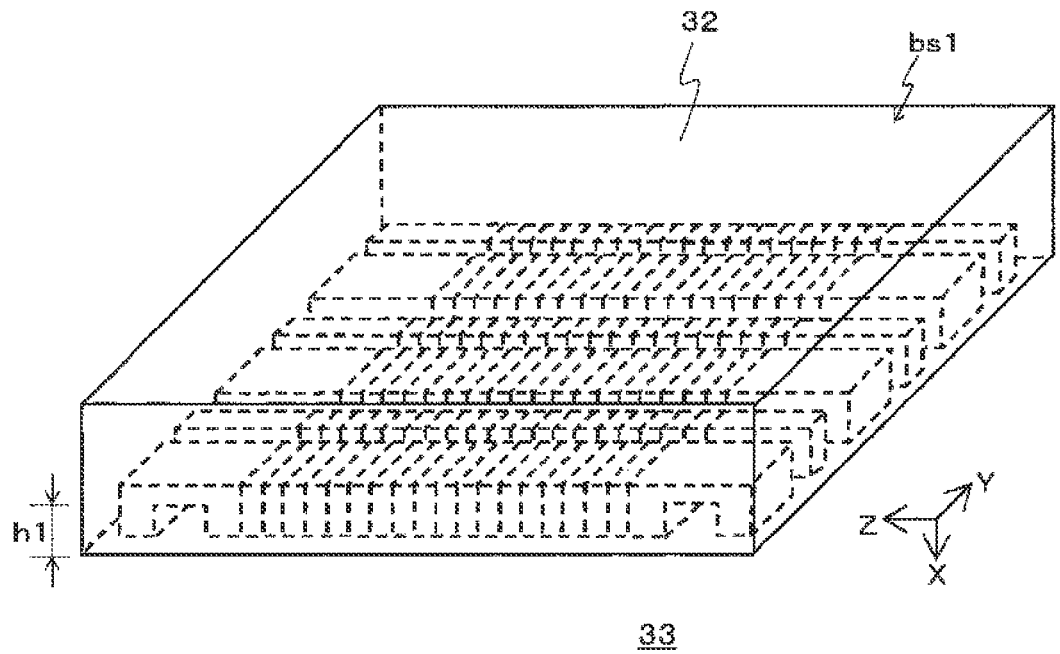
FIG. 7 is a perspective view schematically showing a resin-cured assembly formed by a step A7 in the method of the first embodiment.
Figure 8:
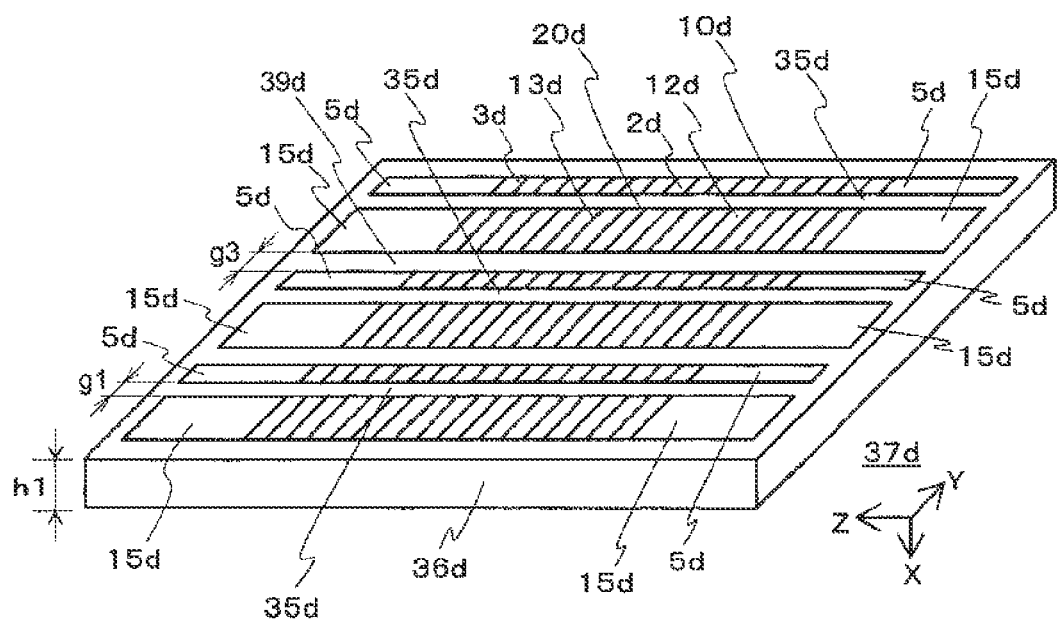
FIG. 8 is a perspective view schematically showing a cell array assembly obtained by a step A8 in the method of the first embodiment.

By removing the films 31F, 31R, 31B, 31L and the first support plate 30, an integral resin-cured assembly 33 shown in FIG. 7 is obtained. To remove the remaining adhesive, grinding or polishing is conducted on the lower surface (opposite to the rear surface bs1) of the resin-cured assembly 33. The rear surface bs1 of the resin-cured assembly 33 is also uniformly ground to a thickness h1, so that pluralities of YGAG cell arrays 10c and GOS cell arrays 20c are exposed (step A8). As shown in FIG. 8, each cell can be precisely as thick as h1 by grinding the upper and lower surfaces of the resin-cured assembly 33, thereby obtaining an integral cell array assembly 37d having a thickness h1. Because the YGAG sticks 10b and the GOS stick 20b are fixed to the first support plate 30 by the adhesive member, their heights may differ slightly. Height differences due to fixing with the adhesive member can be eliminated completely by grinding both surfaces of the resin-cured assembly 33 to a thickness h1.

The grinding of the resin-cured assembly 33 to a thickness h1 turns pluralities of YGAG cell arrays 10c and GOS cell arrays 20c to pluralities of YGAG cell arrays 10d and GOS cell arrays 20d, respectively, and pluralities of YGAG cells 2c and GOS cells 12c to YGAG cells 2d and GOS cells 12d, respectively. The grooves 3c of each YGAG cell array 10d are turned to resin-filled layers (resin layers) 3d, and the grooves 13c of each GOS cell array 20d are turned to resin-filled layers (resin layers) 13d. Gaps between adjacent YGAG cell arrays 10d and GOS cell arrays 20d in each set are turned to resin layers 35d each having a width g1, and gaps between the YGAG cell arrays 10d and the GOS cell arrays 20d in adjacent sets are turned to resin layers 39d each having a width g3. A resin layer 36d surrounding all YGAG cell arrays 10d and GOS cell arrays 20d is also formed.

Figure 9:
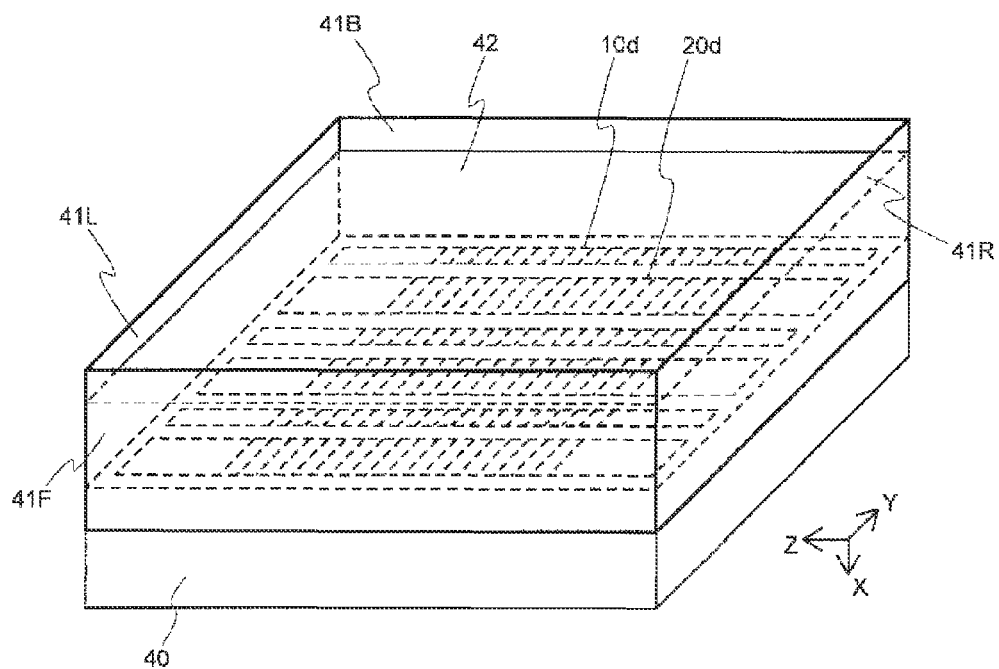
FIG. 9 is a perspective view schematically showing a step A9 in the method of the first embodiment.

To form a resin layer acting as a reflector on one surface of the cell array assembly 37d, as shown in FIG. 9, the cell array assembly 37d is placed on a second support plate (for example, glass plate) 40 having the same area as that of the cell array assembly 37d, and four resin-storing films 41F, 41R, 41B, 41L are attached to four side surfaces of the second support plate 40 to form a resin-filling space. A resin 42 containing fine, white titanium oxide particles is poured into this space (step A9). The resin 42 has the same composition as that of the resin 32. By curing the resin 42, a resin layer 42a constituting a reflector is formed on one surface of the cell array assembly 37d.

Figure 10A:
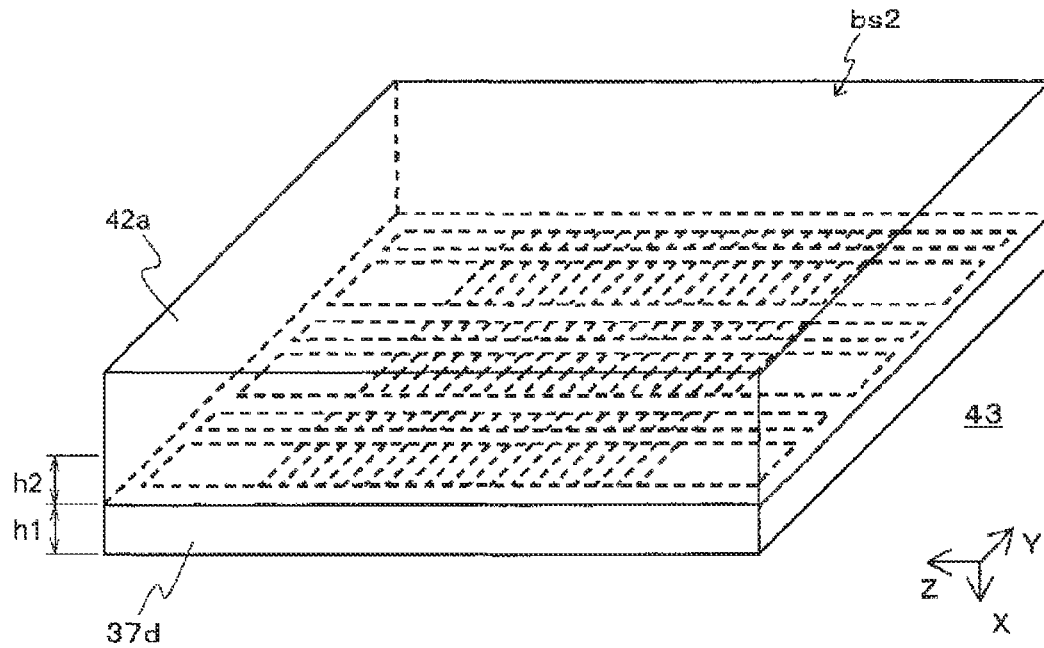
FIG. 10(a) is a perspective view schematically showing a cell array assembly coated with a resin by a step A9 in the method of the first embodiment.
Figure 10B:
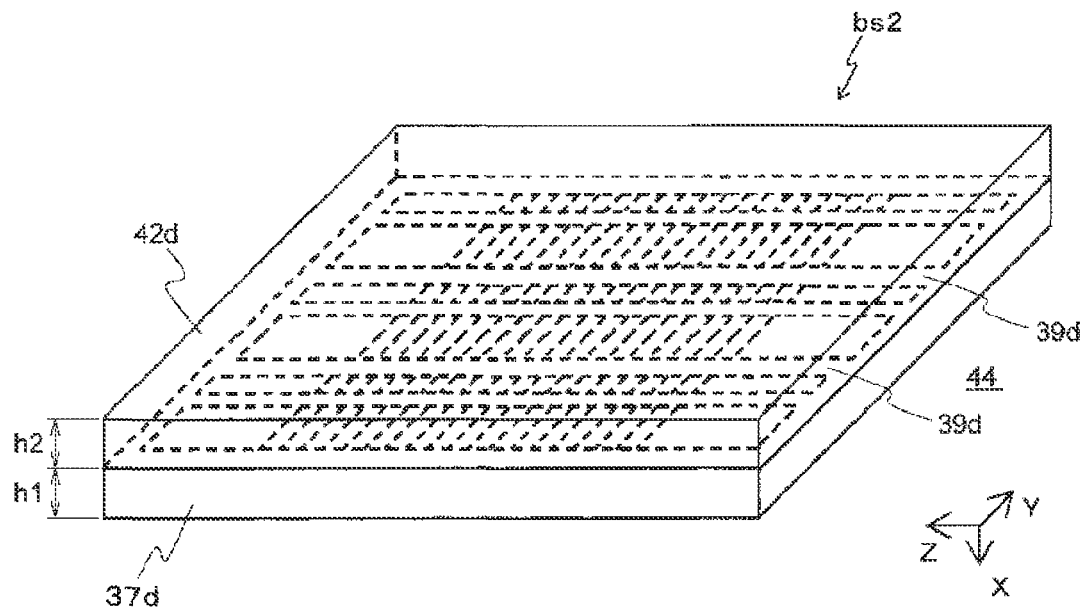
FIG. 10(b) is a perspective view schematically showing a scintillator array assembly obtained by grinding a resin layer by a step A10 in the method of the first embodiment.

After curing the resin 42, the resin-storing films 41F, 41R, 41B, 41L and the second support plate 40 are removed to obtain a resin-coated cell array assembly 43 shown in FIG. 10(a). The resin layer 42a of the resin-coated cell array assembly 43 is ground to a predetermined thickness h2 without exposing the YGAG cell arrays 10d and the GOS cell arrays 20d (step A10). Thus obtained is a scintillator array assembly 44 comprising YGAG cell arrays 10d and GOS cell arrays 20d with a predetermined thickness h1, and a resin layer 42d with a predetermined thickness h2 as shown in FIG. 10(b).

To obtain a dual-array-type scintillator array comprising a pair of a YGAG cell array 10d and a GOS cell array 20d, a resin layer 39d between a YGAG cell array 10d and a GOS cell array 20d in adjacent sets is cut to half along its centerline. As a result, the scintillator array assembly 44 is divided to dual arrays each comprising a pair of a YGAG cell array 10d and a GOS cell array 20d. A periphery of the divided dual array is ground to a predetermined size to obtain a dual-array-type scintillator array shown in FIG. 11 (step A11). After cutting off the end portions 5d of the YGAG cell array 10d and the end portions 15d of the GOS cell array 20d with the resin layers 3d, 13d left, the thickness of the exposed resin layers 3d, 13d is adjusted by grinding.

As shown in FIG. 11, a line of plural YGAG cells and a line of plural GOS cells are in parallel via an intermediate layer 35e derived from the resin layer 35d, with pairing YGAG cells and GOS cells disposed at precise positions. All of gaps between the cells, the periphery layer and the intermediate layer 35e are resin layers having the same composition. The YGAG cells 2d and the GOS cells 12d are exposed only on a surface corresponding to the lower surface in FIG. 10(b), constituting a light-emitting surface of each cell.

[2] Second Embodiment

Because the production method of a scintillator array according to the second embodiment of the present invention is the same as the method of the first embodiment except for part of the steps, explanations of the same steps will be omitted. Accordingly, with respect to the steps whose explanations are omitted, please refer to the explanations in the first embodiment.

Up to the steps A1, A2 and a1, a2, it is the same as the first embodiment. In the steps A3 and a3, the YGAG stick 10b is cut by a rotating grinder 19 to a width (d1+a grinding margin), and the GOS stick 20b is cut to a width (d2+a grinding margin). Side surfaces of YGAG sticks 10b and GOS sticks 20b obtained by cutting the YGAG substrate 10a and the GOS substrate 20a each having a rectangular plate shape in the steps A3 and a3 are ground to precisely adjust their widths to d1 and d2, respectively. Alternatively, side surfaces of YGAG sticks 10b and GOS sticks 20b obtained by cutting the YGAG substrate 10a and the GOS substrate 20a each having a rectangular plate shape in the steps A3 and a3 may be ground to precisely adjust their widths to (d1+a grinding margin) and (d2+a grinding margin), respectively. In this case, after fixing the YGAG sticks 10b and the GOS sticks 20b to a sealing plate, their widths are precisely adjusted to d1 and d2, respectively.

In the step A5, the distance between a YGAG stick 10b and a GOS stick 20b in each set is determined to g2, smaller than g1, by a first spacer (for example, a pin) having a smaller diameter than in the first embodiment. After all sticks 10b, 20b are arranged on a pressure-sensitive adhesive or a pressure-sensitive, double-sided adhesive film via first to third spacers, a press plate is placed on the upper surfaces of the sticks 10b, 20b, and uniformly pressed in an X direction. The sticks 10b, 20b are then cut by a rotating grinder, until a gap (width: g2) between a pair of a YGAG stick 10b and a GOS stick 20b has a width g1. Thereafter, steps after the step A6 are conducted in the same manner as in the first embodiment to obtain a scintillator array. In the method of the second embodiment, cutting with a rotating grinder provides a precise gap g1.

[3] Third Embodiment

Figure 12:
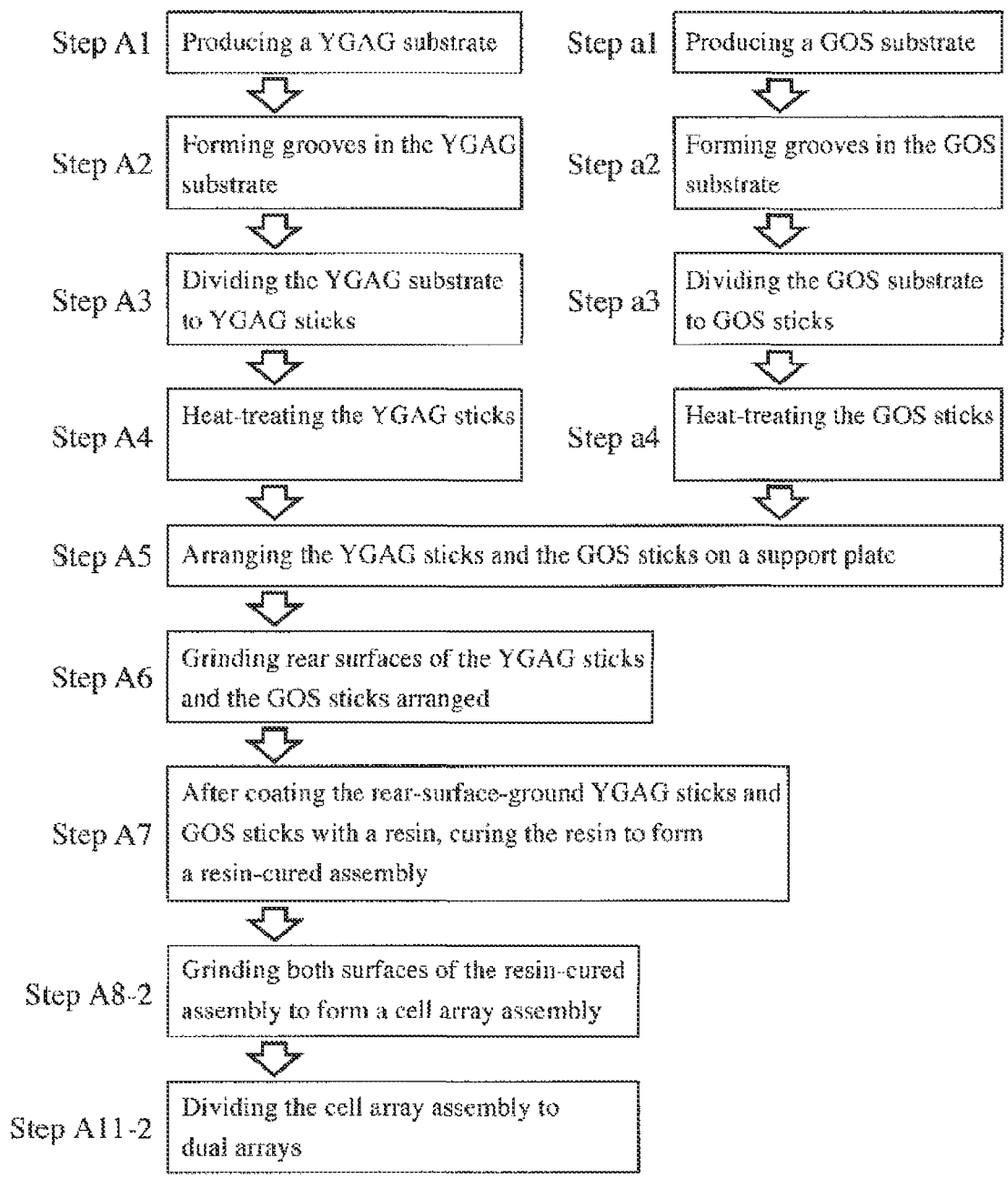
FIG. 12 is a flow chart showing the production method of a scintillator array according to the third embodiment of the present invention.

FIG. 12 is a flow chart showing the production method of a scintillator array according to the third embodiment of the present invention. The method of the third embodiment is the same as that of the first embodiment up to the step A7, but different from that of the first embodiment except for changing the step A8 to a step A8-2 and omitting the steps A9 and A10.

After the step A7, the resin-storing films 31F, 31R, 31B, 31L and the first support plate 30 are removed to obtain the resin-cured assembly 33 shown in FIG. 7. To remove a thin adhesive member remaining on a lower surface of the resin-cured assembly, grinding is conducted. Grinding is also conducted on a rear surface bs1 of the resin-cured assembly, to remove part of the resin 32 on the rear surface to a thickness of (h1+h2) (step A8-2). This grinding of both surfaces provides a resin-coated cell array assembly comprising a reflector having a thickness h2 on the rear surface side.

The resin-coated cell array assembly is then divided, and the periphery of the resultant array is ground to a predetermined size to provide a dual-array-type scintillator array comprising a pair of a YGAG cell array 10d and a GOS cell array 20d as shown in FIG. 11 (step A11-2).

Of course, the above steps A8-2 and A11-2 may be used in the method of the second embodiment. By omitting part of the steps, the third embodiment is smaller than the first embodiment in the number of steps.

[4] Fourth Embodiment

Figure 13:
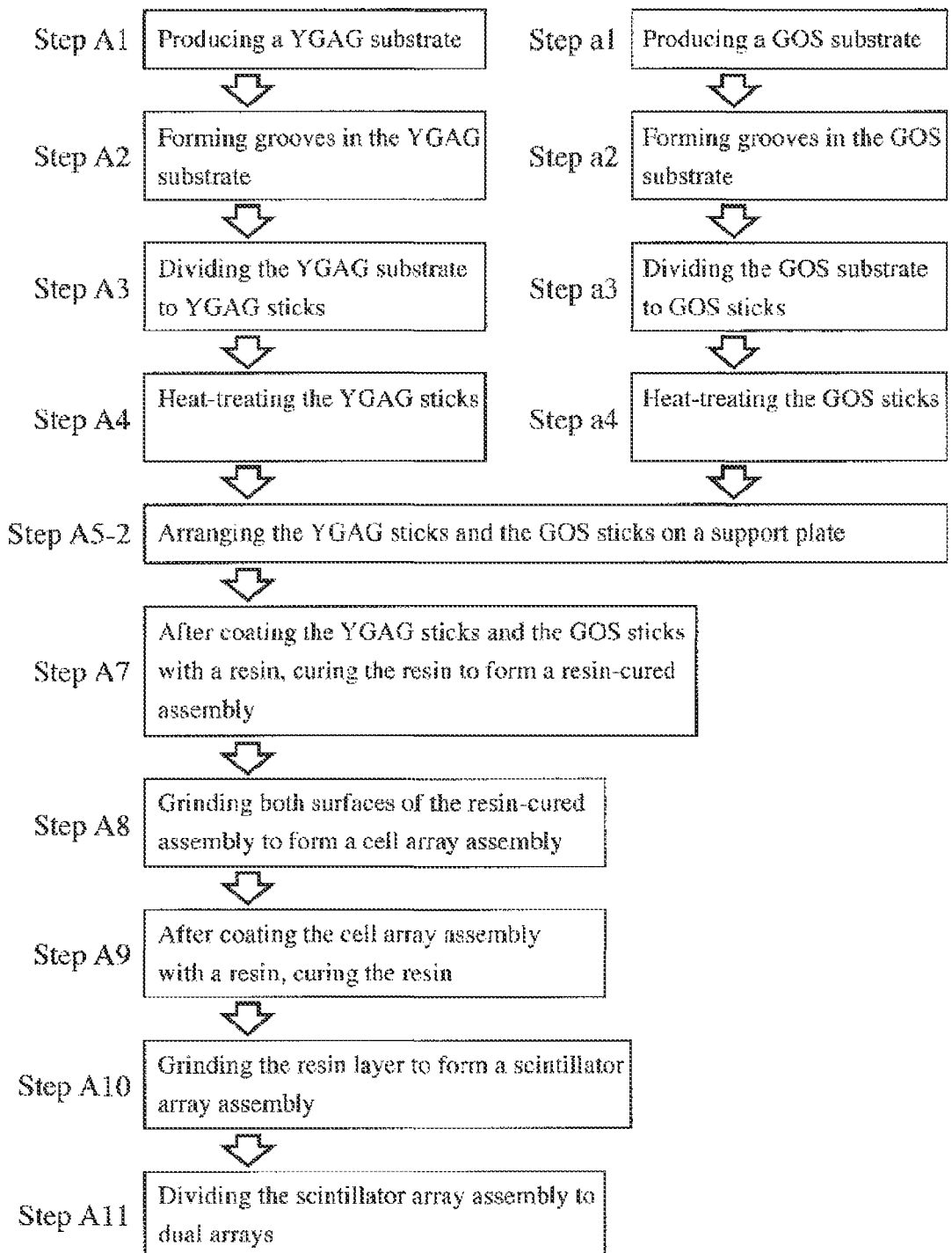
FIG. 13 is a flow chart showing the production method of a scintillator array according to the fourth embodiment of the present invention.

FIG. 13 is a flow chart showing the production method of a scintillator array according to the fourth embodiment of the present invention. The method of the fourth embodiment is the same as that of the first embodiment up to the production and heat treatment of YGAG sticks 10b, and the production and heat treatment of GOS sticks 20b (up to the step A4 and the step a4).

Figure 14:
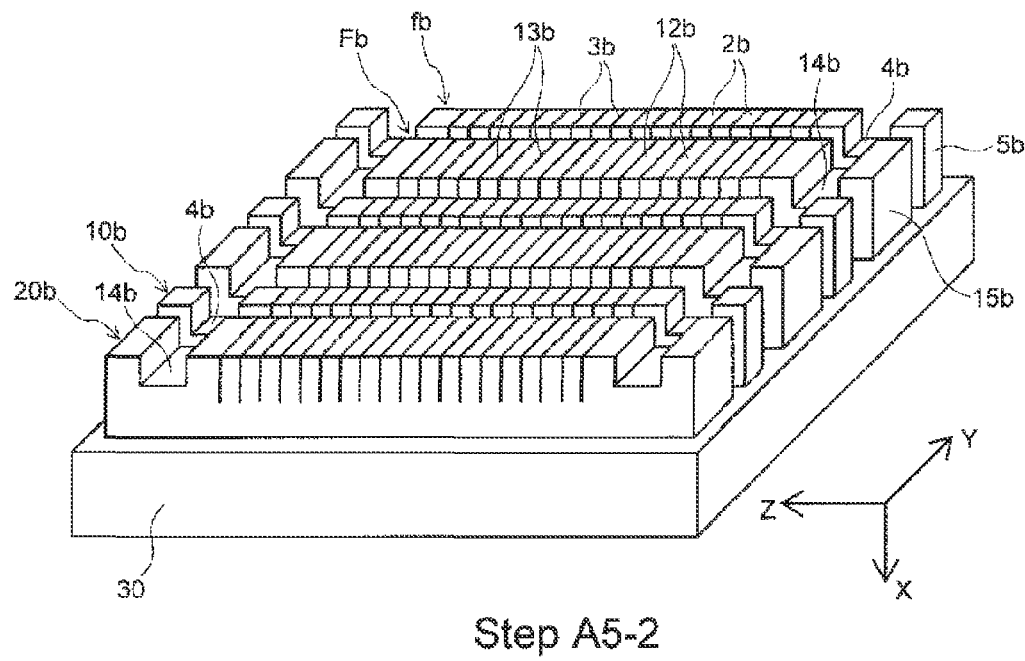
FIG. 14 is a perspective view schematically showing YGAG sticks and GOS sticks disposed on a first support plate via an adhesive member and first to third spacers by a step A5-2 in the fourth embodiment.
Figure 15:
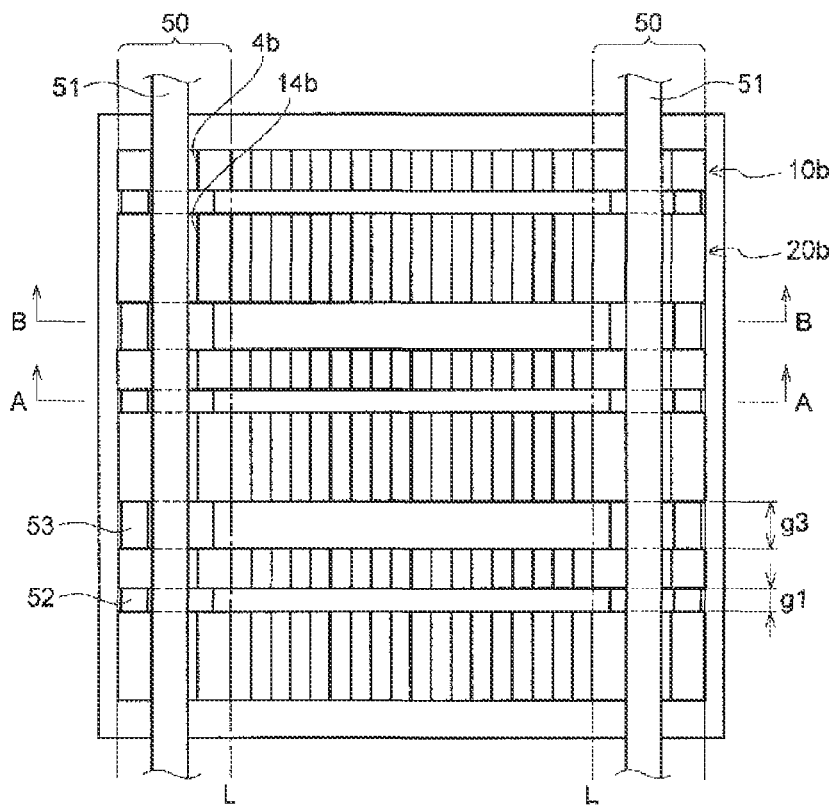
FIG. 15 is a plan view showing the arrangement of the YGAG sticks, the GOS sticks, the adhesive member, and the first to third spacers on the first support plate.

As shown in FIGS. 14 and 15, the YGAG sticks 10b and the GOS sticks 20b are alternately disposed with the grooves 3b and 13b upward, on the surface fs of the first support plate 30 via an adhesive member in the step A5-2. Namely, the front surfaces fb of the YGAG sticks 10b and the front surfaces Fb of the GOS sticks 20b are directed upward with their grooves 3b and 13b open upward. After the positioning grooves 4b and 14b of the YGAG sticks 10b and the GOS sticks 20b are aligned in a Y direction, first spacers 51 are inserted into two lines of the positioning grooves 4b and 14b. The first spacers 51 are square-cross-sectioned, rod-shaped pins.

Figure 16A:
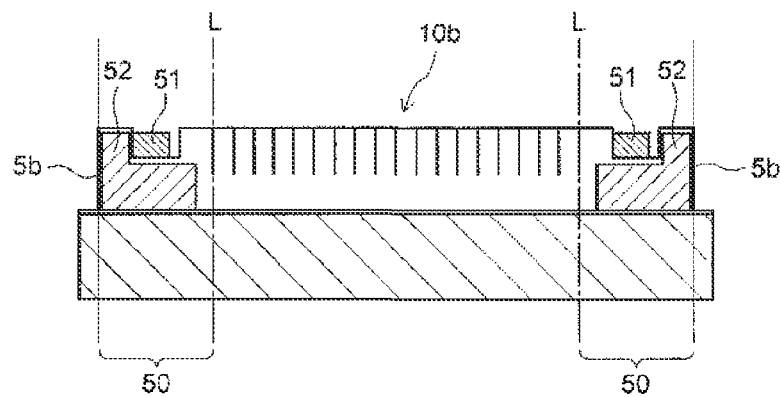
FIG. 16(a) is a cross-sectional view taken along the line A-A in FIG. 15.
Figure 16B:
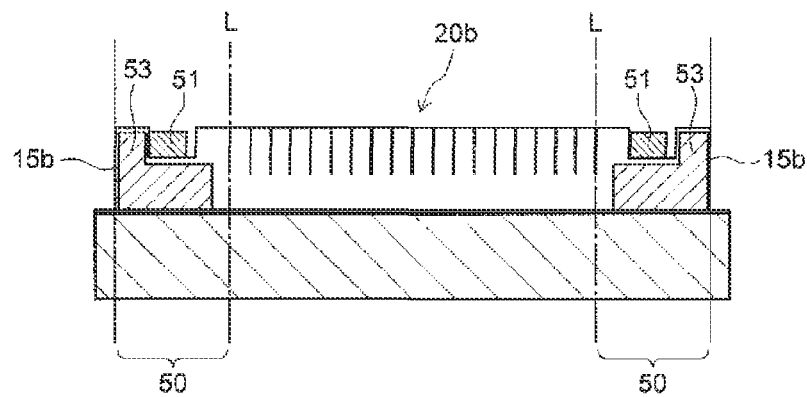
FIG. 16(b) is a cross-sectional view taken along the line B-B in FIG. 15.

As shown in FIG. 15, a second spacer 52 is disposed between a YGAG stick 10b and a GOS stick 20b in each set, and a third spacer 53 is disposed between a YGAG stick 10b and a GOS stick 20b in adjacent sets. The second and third spacers 52, 53 have the same thicknesses g1, g3 as those of the second and third spacers used in the first embodiment. Because base portions of the YGAG sticks 10b and the GOS sticks 20b should be removed by grinding after the resin is cured, the second and third spacers 52, 53 cannot be disposed in regions where the base portions have grooves 3b, 13b. Accordingly, in place of the rod-shaped pins in the first embodiment, plates as large as received in portions (later-cut-off portions) 50 between the outermost grooves 3b, 13b and the end surfaces 5b, 15b of the YGAG sticks 10b and the GOS sticks 20b are preferably used as shown in FIGS. 16(a) and 16(b). The second and third spacers 52, 53 in a plate shape preferably have as large areas as possible for higher gap precision, and they are preferably in an L shape, for example.

After all YGAG sticks 10b and GOS sticks 20b are temporarily positioned via the first to third spacers, the first spacers 51 are first precisely positioned and fixed to an external frame (not shown). Because the YGAG sticks 10b and the GOS sticks 20b are movable in a Y direction in this state, the YGAG sticks 10b and the GOS sticks 20b arranged via the second and third spacers 52, 53 are lightly pushed in a Y direction to have Y-direction distances of g1 and g3 alternately. Thereafter, all YGAG sticks 10b and GOS sticks 20b are lightly pushed in a Z direction, so that one surface of each positioning groove 4b and 14b abuts one surface of the first spacer 51. This procedure is repeated plural times to achieve higher positioning precision in Y and Z directions for the YGAG sticks 10b and the GOS sticks 20b.

When a pressure-sensitive adhesive or a pressure-sensitive, double-sided adhesive film is applied to a surface fs of the first support plate 30, a press plate (not shown) is placed on the upper surfaces of all YGAG sticks 10b and GOS sticks 20b precisely positioned via the first to third spacers 51-53, and uniformly pressed in an X direction (perpendicular to the sticks 10b, 20b), so that the pressure-sensitive adhesive or the pressure-sensitive, double-sided adhesive film exhibits adhesion to fix the rear surfaces bb of the YGAG sticks 10b and the rear surfaces Bb of the GOS sticks 20b to the surface fs of the first support plate 30. Removing the press plate, the front surfaces fb of the YGAG sticks 10b and the front surfaces Fb of the GOS sticks 20b are exposed.

Figure 17:
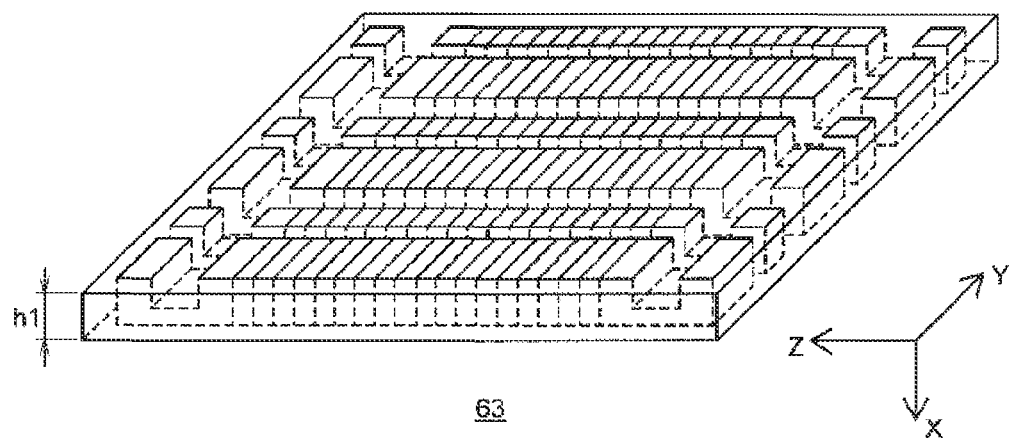
FIG. 17 is a perspective view schematically showing a resin-cured assembly formed by a step A7 in the fourth embodiment.

After the first spacers 51 received in the positioning grooves 4b, 14b are removed, the step A7 shown in FIG. 6 is conducted to obtain an integral resin-cured assembly 63 shown in FIG. 17. A lower surface of the resin-cured assembly 63 is ground until the base portions of the YGAG sticks 10b and the GOS sticks 20b disappear, and an upper surface of the resin-cured assembly 63 is ground until the grooves 3b, 13b of the YGAG sticks 10b and the GOS sticks 20b are exposed, with a thickness controlled to h1. As shown by dashed lines L in FIGS. 15 and 16, the resin-cured assembly 63 is cut along the end surfaces of the resin layers 3d, 13d in the grooves 3b, 13b, so that the second and third spacers 52, 53 can be removed together with the end portions of the YGAG sticks 10b and the GOS sticks 20b. Thus, the same integral cell array assembly as shown in FIG. 8 is obtained. The subsequent steps may be the same as in the first embodiment. Though it may be considered that the resin-cured assembly 63 is ground to a thickness of (h1+h2), it is preferable to produce a cell array assembly having a thickness h1 as an intermediate product, because the use of an adhesive member for positioning the YGAG sticks 10b and the GOS sticks 20b does not necessarily provide high X-direction precision.

Figure 18A:
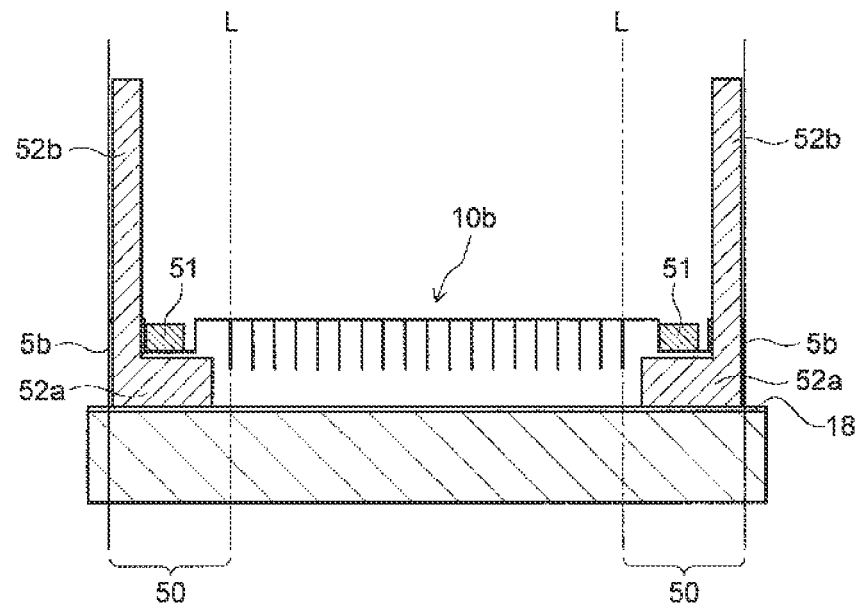
FIG. 18(a) is a cross-sectional view showing one example of second spacers used in the method of the fourth embodiment.
Figure 18B:
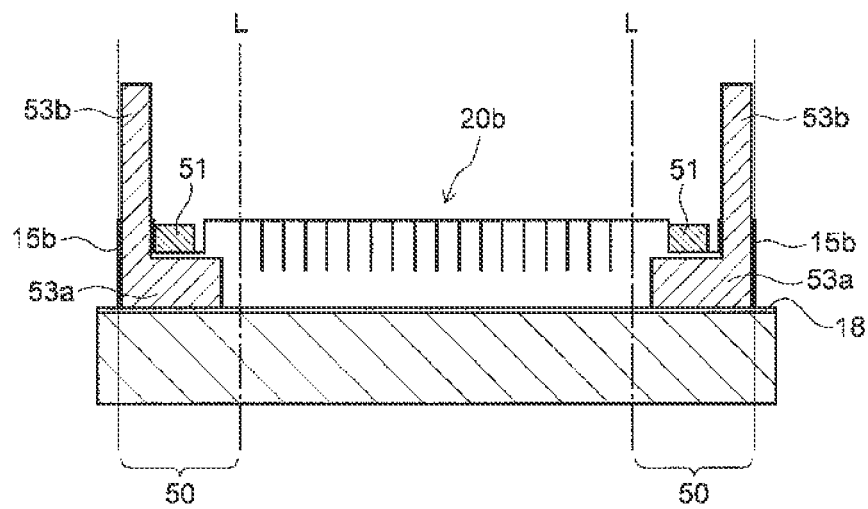
FIG. 18(b) is a cross-sectional view showing one example of third spacers used in the method of the fourth embodiment.

FIGS. 18(a) and 18(b) show another example of the second and third spacers 52a, 53a. Each spacer 52a, 53a is in an L shape integrally having a flat, large-area portion disposed between adjacent scintillator sticks 10b, 20b, and a vertical portion 52b, 53b extending from the large-area portion above the upper surfaces of the scintillator sticks 10b, 20b. The vertical portion 52b, 53b has such length that it sufficiently projects from the upper surfaces of the YGAG sticks 10b and the GOS sticks 20b. In the figure, the numerical reference "18" represents an adhesive member.

Because the YGAG sticks 10b and the GOS sticks 20b have extremely small height and width, it takes a lot of time to dispose second and third low spacers 52, 53 between the YGAG sticks 10b and the GOS sticks 20b as shown in FIGS. 16(a) and 16(b). Also, when the second and third spacers 52, 53 have similar thicknesses g1, g3, they are often disposed mistakenly, resulting in gap errors between the YGAG sticks 10b and the GOS sticks 20b. To avoid errors, gaps should be sufficiently checked after fixing the second and third spacers 52, 53, taking a lot of time. However, when the second and third spacers 52a, 53a have sufficiently long vertical portions 52b, 53b with different colors, (a) it is easy to dispose the second and third spacers 52a, 53a between the YGAG sticks 10b and the GOS sticks 20b with their vertical portions 52b, 53b held by a pair of tweezers, and (b) it can be easily confirmed whether or not the second and third spacers 52a, 53a are correctly positioned between the YGAG sticks 10b and the GOS sticks 20b, by looking at the colors of the vertical portions 52b, 53b after positioning.

Figure 19A:
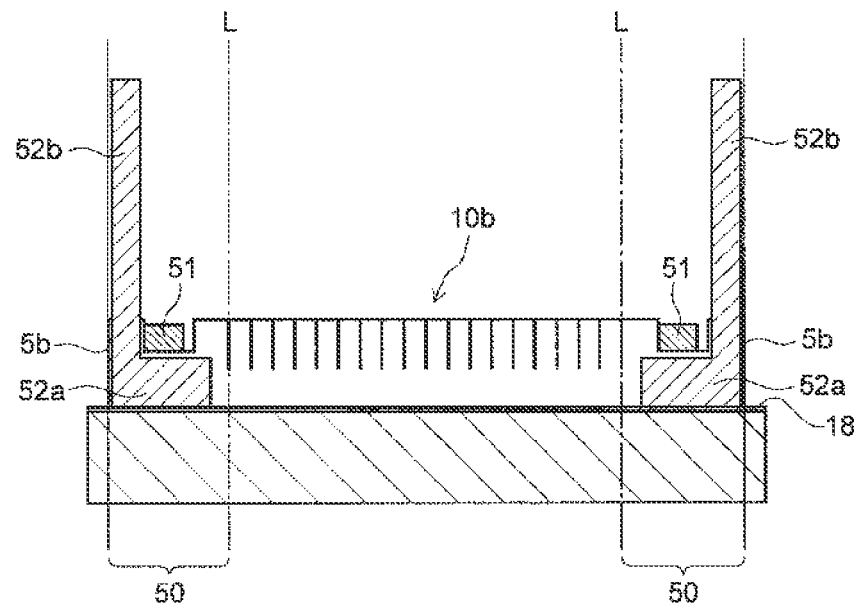
FIG. 19(a) is a cross-sectional view showing another example of the second spacers used in the method of the fourth embodiment.
Figure 19B:
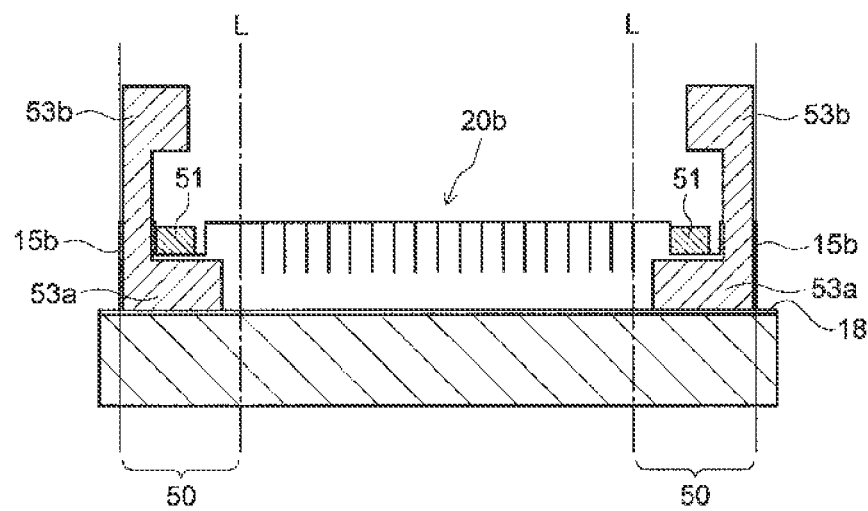
FIG. 19(b) is a cross-sectional view showing another example of the third spacers used in the method of the fourth embodiment.

As exemplified in FIGS. 19(a) and 19(b), if the vertical portions 52b, 53b were provided not only with different colors but also with different lengths and/or widths, it would be easier to confirm whether or not the second and third spacers 52a, 53a are correctly positioned. In the figures, the numerical reference "18" represents an adhesive member.

The vertical portions 52b, 53b need only be colored in their upper portions. The second and third spacers 52a, 53a may be formed by stainless steel plates, etc., with the upper portions of their vertical portions 52b, 53b colored by a thermosetting paint, etc. When coated with a thermosetting resin for a reflector in the subsequent step A7, the colored portions of the vertical portions 52b, 53b of the second and third spacers 52a, 53a do not affect the thermosetting resin for a reflector at all, as long as the colored portions are above a surface of a thermosetting resin liquid for a reflector. The second and third spacers 52a, 53a with colored portions are also removed together with the end portions of the YGAG sticks 10b and the GOS sticks 20b, by cutting the resin-cured assembly 63 along dashed lines L as described above.

In the method of the fourth embodiment, the flat rear surfaces bb, Bb (without grooves 3b, 13b) of the YGAG sticks 10b and the GOS sticks 20b are attached to the adhesive member, resulting in high adhesion strength and high positioning precision. Because the base portions of the YGAG sticks 10b and the GOS sticks 20b are removed by grinding after integration with a resin, the arrangement of the YGAG cells and the GOS cells is not disturbed, thereby providing a dual-array-type scintillator array arranged with high precision. Also, with long vertical portions 52b, 53b with colored upper portions, not only positioning but also the confirmation of correct positioning are made easier.

The present invention will be explained in more detail referring to Examples below without intention of restriction.

Example 1

Using the method of the first embodiment, a dual-array-type scintillator array shown in FIG. 11 was produced under the following conditions from a sintered YGAG substrate having a composition of $(Y_{0.8}Gd_{0.2}Ce_{0.003})_{3.0}(Ga_{0.5}Al_{0.5})_{5.0}O_{12}$, and a sintered GOS substrate having a composition of $(Gd_{0.999}Pr_{0.001}Ce_{0.00001})_2O_2S$. The heat treatment of YGAG sticks was conducted at 1300° C. in the air, and the heat treatment of GOS sticks was conducted at 1200° C. in an oxygen-containing argon atmosphere. Glass plates were used as the first and second support plates, a pressure-sensitive, double-sided adhesive film was used as the adhesive member, and round stainless steel rods were used as rod-shaped pins and spacer pins. A thermosetting epoxy resin containing white titanium oxide powder was used as the reflector resin. A diamond grinder was used as a rotating grinder. In the scintillator array produced by the method of the first embodiment, cell arrays had sufficiently high dimensional precision.

Example 2

Using the method of the second embodiment, a dual-array-type scintillator array was produced under the same conditions as in Example 1 except for applying a pressure-sensitive adhesive as the adhesive member. In the scintillator array produced by the method of the second embodiment, the arrangement of cells had sufficiently high dimensional precision.

Example 3

Using the method of the third embodiment, a dual-array-type scintillator array was produced under the same conditions as in Example 1. In the scintillator array produced by the method of the third embodiment, the arrangement of cells had sufficiently high dimensional precision.

Example 4

Using the method of the fourth embodiment, a dual-array-type scintillator array was produced under the same conditions as in Example 1. In the scintillator array produced by the method of the fourth embodiment, the arrangement of cells had sufficiently high dimensional precision.

Effect of the Invention

The method of the present invention can efficiently produce a dual-array-type scintillator array comprising two types of scintillators having different detection sensitivities depending on an X-ray energy distribution, with high precision. Particularly, because first and second scintillator sticks obtained by providing first and second scintillator substrates with pluralities of grooves and cutting them in directions perpendicular to the grooves are disposed on a support plate, the arrangement of first and second cells is easy with high precision. Further, the use of first to third spacers enables the precise positioning of the first and second cells.

By using second and third spacers each integrally having a flat, large-area portion disposed between adjacent scintillator sticks, and a vertical portion extending from the large-area portion above the upper surfaces of the first and second scintillator sticks, the positioning of the first and second scintillator sticks with extremely small height and width is made easier, and the confirmation of their positioning is also made easier.

The method of the present invention having the above features is suitable for the production of ceramic scintillator arrays for CT apparatuses or baggage inspection apparatuses.

What is claimed is:

1. A method for producing a dual-array-type scintillator array comprising the steps of
   (1) forming a first scintillator stick comprising first scintillator cell portions arranged like a comb by providing a first scintillator substrate with pluralities of grooves, and then cutting said first scintillator substrate in a direction perpendicular to said grooves;
   (2) forming a second scintillator stick comprising second scintillator cell portions arranged like a comb by providing a second scintillator substrate having a different composition from that of said first scintillator substrate with pluralities of grooves, and then cutting said second scintillator substrate in a direction perpendicular to said grooves;
   (3) arranging and fixing plural sets of said first and second scintillator sticks with said first and second scintillator cell portions downward onto a support plate;
   (4) removing base portions from said first and second scintillator sticks by grinding to expose the grooves of said first and second scintillator sticks on the surface, thereby obtaining plural sets of first cell arrays and second cell arrays arranged in parallel, each first cell array being obtained from a line of the first scintillator cells, and each second cell array being obtained from a line of the second scintillator cells;
   (5) forming an integral resin-cured assembly comprising plural sets of said first and second cell arrays arranged in parallel by filling at least grooves and gaps of said first and second cell arrays with a resin for a reflector, curing said resin, and then removing said support plate; and
   (6) cutting a resin layer between adjacent sets of said first and second cell arrays to divide said resin-cured assembly to sets of said first and second cell arrays.

2. The method for producing a scintillator array according to claim 1, wherein both surfaces of said resin-cured assembly are ground to form an integral cell array assembly having a predetermined thickness, from which said first cell arrays and said second cell arrays are exposed, and then one surface of said cell array assembly, from which said first and second cell arrays are exposed, is coated with the resin for a reflector.

3. The method for producing a scintillator array according to claim 2, wherein after one surface of said cell array assembly, from which said first and second cell arrays are exposed, is coated with the resin for a reflector, a coating layer of said resin for a reflector is ground to a predetermined thickness.

4. The method for producing a scintillator array according to claim 1, wherein said first and second scintillator sticks are heat-treated.

5. The method for producing a scintillator array according to claim 1, wherein each of said first and second scintillator sticks has a pair of positioning grooves on both sides of said grooves, wherein a first spacer is inserted into each positioning groove of said first and second scintillator sticks; wherein a second spacer is disposed between said first scintillator stick and said second scintillator stick in each set; and wherein a third spacer is disposed between said first scintillator stick and said second scintillator stick in adjacent sets.

6. A method for producing a dual-array-type scintillator array comprising the steps of
   (1) forming a first scintillator stick comprising first scintillator cell portions arranged like a comb by providing a first scintillator substrate with pluralities of grooves, and then cutting said first scintillator substrate in a direction perpendicular to said grooves;
   (2) forming a second scintillator stick comprising second scintillator cell portions arranged like a comb by providing a second scintillator substrate having a different composition from that of said first scintillator substrate with pluralities of grooves, and then cutting said second scintillator substrate in a direction perpendicular to said grooves;
   (3) arranging and fixing plural sets of said first and second scintillator sticks with said first and second scintillator cell portions upward onto a support plate;
   (4) forming an integral resin-cured assembly comprising said first and second scintillator sticks by filling at least grooves and gaps of said first and second scintillator sticks with a resin for a reflector, curing said resin, and then removing said support plate;
   (5) removing base portions from said first and second scintillator sticks by grinding, to form an integral cell array assembly comprising plural sets of first cell arrays and second cell arrays arranged in parallel, each first cell array being obtained from said first scintillator cell portions, and each second cell array being obtained from said second scintillator cell portions; and
   (6) cutting a resin layer between adjacent sets of said first and second cell arrays to divide said cell array assembly to sets of said first and second cell arrays.

7. The method for producing a scintillator array according to claim 6, wherein both surfaces of said resin-cured assembly are ground to form a cell array assembly having a predetermined thickness, from which said first cell arrays and said second cell arrays are exposed, and then one surface of said cell array assembly, from which said first and second cell arrays are exposed, is coated with the resin for a reflector.

8. The method for producing a scintillator array according to claim 7, wherein a coating layer of said resin for a reflector is ground to a predetermined thickness.

9. The method for producing a scintillator array according to claim 6, wherein said first and second scintillator sticks are heat-treated.

10. The method for producing a scintillator array according to claim 6, wherein each of said first and second scintillator sticks has a pair of positioning grooves on both sides of said grooves; wherein a first spacer is inserted into each positioning groove of said first and second scintillator sticks; wherein a second spacer is disposed between said first scintillator stick and said second scintillator stick in each set; and wherein a third spacer is disposed between said first scintillator stick and said second scintillator stick in adjacent sets.

11. The method for producing a scintillator array according to claim 10, wherein each of said second and third spacers has a flat, large-area portion disposed between adjacent scintillator sticks, and a vertical portion extending from said large-area portion above the upper surfaces of said first and second scintillator sticks; and wherein the vertical portions of said second spacers and the vertical portions of said third spacers partially have different colors.

12. The method for producing a scintillator array according to claim 10, wherein the vertical portions of said second and third spacers have different heights and/or widths.

* * * * *